(12) United States Patent
Schutt et al.

(10) Patent No.: US 8,408,889 B2
(45) Date of Patent: Apr. 2, 2013

(54) DEVICE FOR MELTBLOWING

(75) Inventors: Gunter Schutt, Neumunster (DE);
Nicola Mueller-Reichau, Kiel (DE);
Bernhard Potratz, Hamburg (DE)

(73) Assignee: Oerlikon Textile GmbH & Co. KG, Remscheid (DE)

( * ) Notice: Subject to any disclaimer, the term of this patent is extended or adjusted under 35 U.S.C. 154(b) by 651 days.

(21) Appl. No.: 12/652,795

(22) Filed: Jan. 6, 2010

(65) Prior Publication Data

US 2010/0178372 A1 Jul. 15, 2010

(30) Foreign Application Priority Data

Jan. 14, 2009 (DE) .......... 10 2009 004 541

(51) Int. Cl.
*D01D 5/14* (2006.01)

(52) U.S. Cl. ..... 425/7; 425/72.2; 425/192 S; 425/382.2; 425/464

(58) Field of Classification Search ............. 425/7, 72.2, 425/192 S, 382.2, 464
See application file for complete search history.

(56) References Cited

U.S. PATENT DOCUMENTS

| | | | | |
|---|---|---|---|---|
| 5,087,186 A | * | 2/1992 | Buehning | 425/72.2 |
| 5,260,003 A | * | 11/1993 | Nyssen et al. | 264/6 |
| 5,632,938 A | * | 5/1997 | Buehning, Sr. | 264/39 |
| 5,728,407 A | * | 3/1998 | Matsui | 425/7 |

* cited by examiner

*Primary Examiner* — Yogendra Gupta
*Assistant Examiner* — Joseph Leyson
(74) *Attorney, Agent, or Firm* — BainwoodHuang

(57) ABSTRACT

A device for meltblowing of synthetic fibers utilizes an elongated spinneret packet that is held at the bottom side of the spinneret carrier. In order to supply process air the two elongated air tubes extend at the opposite longitudinal sides of the spinneret carrier, which are connected to an air distribution device having an air channel system in the spinneret carrier. In order to avoid thermal stress in the expansion joints between the air distribution device and the spinneret carrier as much as possible, the air distribution devices are embodied by means of multiple distribution segments having an expansion joint between adjacent distribution segments.

6 Claims, 4 Drawing Sheets

DEVICE FOR MELTBLOWING

FOREIGN PRIORITY CLAIM

This Patent Application claims priority to German Patent Application No. 10 2009 004 541.4, filed on Jan. 14, 2009, entitled, "DEVICE FOR MELTBLOWING", the contents and teachings of which are hereby incorporated by reference in their entirety.

TECHNICAL FIELD

Embodiments of the invention relate to a device for meltblowing synthetic fibers utilizing an elongated spinneret packet that is held at a bottom side of a spinneret carrier.

BACKGROUND

A generic device for meltblowing is known, for example, from DE 10 2005 053 248 A1.

In the production of synthetic fibers from a melt of a thermoplastic material, it is known that the freshly extruded fibers are withdrawn from an extrusion opening of a spinneret by means of hot process air. The method is called a meltblown method, and is preferably utilized for the production of synthetic nonwovens. The fibers guided through the process air are deposited on a deposit belt into a nonwoven after extruding and reinforcing. Devices are utilized for carrying out such methods, wherein a thermoplastic melt and hot process air must be combined. Such a device for meltblowing is described, for example, in DE 10 2005 053 248 A1. For this purpose a spinneret packet is held at the bottom side of a spinneret carrier, which is connected in the spinneret carrier via melt channels and air channels. The induction of process air is carried out at both longitudinal sides of the spinneret carrier, at which one air tube extends, in which hot process air is guided. In order to connect the air channels in the spinneret carrier to the air tubes, air distribution devices are attached at each longitudinal side of the spinneret carrier. The air distribution devices are held on the longitudinal side across the entire length of the spinneret carrier.

SUMMARY

When producing nonwovens it is desirable to produce working widths that are as large as possible such that respectively long spinneret carriers and spinneret packets are necessary in order to form such nonwovens. For this purpose, however, the longitudinal expansions occurring due to the heating of the components have an adverse effect, particularly in the area of the air distribution devices. In particular, undesired tension conditions occur, particularly in the separating joint between the spinneret carrier and the air distribution device, which may lead to the destruction of attachment elements.

It is therefore an object of certain embodiments of the invention to embody the device for meltblowing of the generic type such that independently of the length of the spinneret carrier a safe air feed of hot process air is possible across the entire length of the spinneret carrier.

The disadvantage is remedied according to an embodiment of the invention in that the air distribution devices are formed by means of a plurality of distribution segments being arranged at the longitudinal sides of the spinneret carrier in a distributed manner, each having an expansion joint between adjacent distribution segments.

Advantageous further improvements of certain embodiments of the invention are defined by the characteristics and characteristics combinations of various features.

Certain embodiments of the invention have the particular advantage that the spinneret carrier and the air distribution devices do not have to be adjusted to each other in terms of the thermal behavior thereof. Due to the splitting into multiple partial segments the longitudinal expansions occurring at the air distribution device due to the high temperatures of the process air can be maintained at non-critical levels. In this manner any unacceptable tension conditions may be avoided during the attachment of the air distribution device to the spinneret carrier.

A further improvement of the air feed can be achieved by means of a further embodiment of the invention, wherein each of the distribution segments is formed from a distribution block attached at the spinneret carrier, and a supply line connected to the air tube. In this manner a rigid connection between the air tubes and the spinneret carrier can be avoided. The material properties and the arrangement of the air tubes can therefore be freely configured. For this purpose only those requirements have to be met, which are necessary for providing hot process air. An adjustment of the conditions of the spinneret carrier is no longer necessary.

In order to eliminate the thermal expansions occurring differently between the spinet carrier and the air tubes, the further embodiment of the invention is preferably to be utilized, wherein the supply lines are each flexibly embodied at a distance between the air tube and the distribution block. In this manner an additional decoupling of the components can be realized.

In order to obtain a supply of the process air that is as uniform as possible across the entire length of the spinneret packet, the distribution blocks each form individual distribution chambers at the longitudinal sides of the spinneret carrier, which supply multiple air channels of the air channel system in the spinneret carrier simultaneously.

A further embodiment of the invention provides that the spinneret carrier and the distribution blocks are formed from different materials. In this manner the distribution blocks may be formed particularly from materials that are especially suitable for guiding process air.

The device according to certain embodiments of the invention is independent of the length of the spinneret carrier. However, the advantages as opposed to conventional devices have a particular effect with larger total lengths of the spinneret carrier. In this way the further embodiment of the invention is applied in a preferred manner, wherein the spinneret carrier has a total length of more than 1,500 mm for receiving the spinneret package and the distribution segments of the air distribution device.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
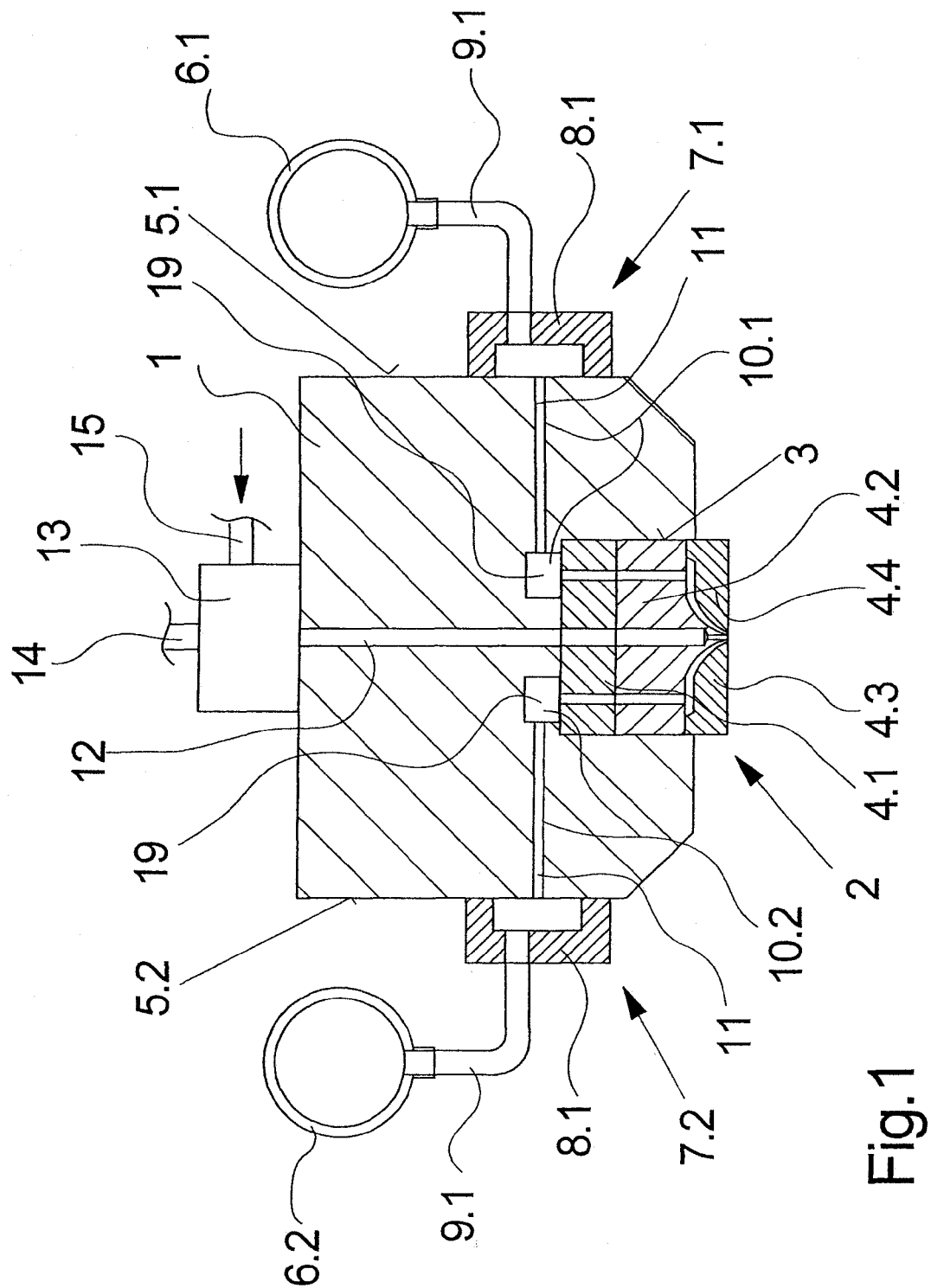
FIG. 1 is a cross-sectional view of a device according to an embodiment of the invention.
Figure 2:
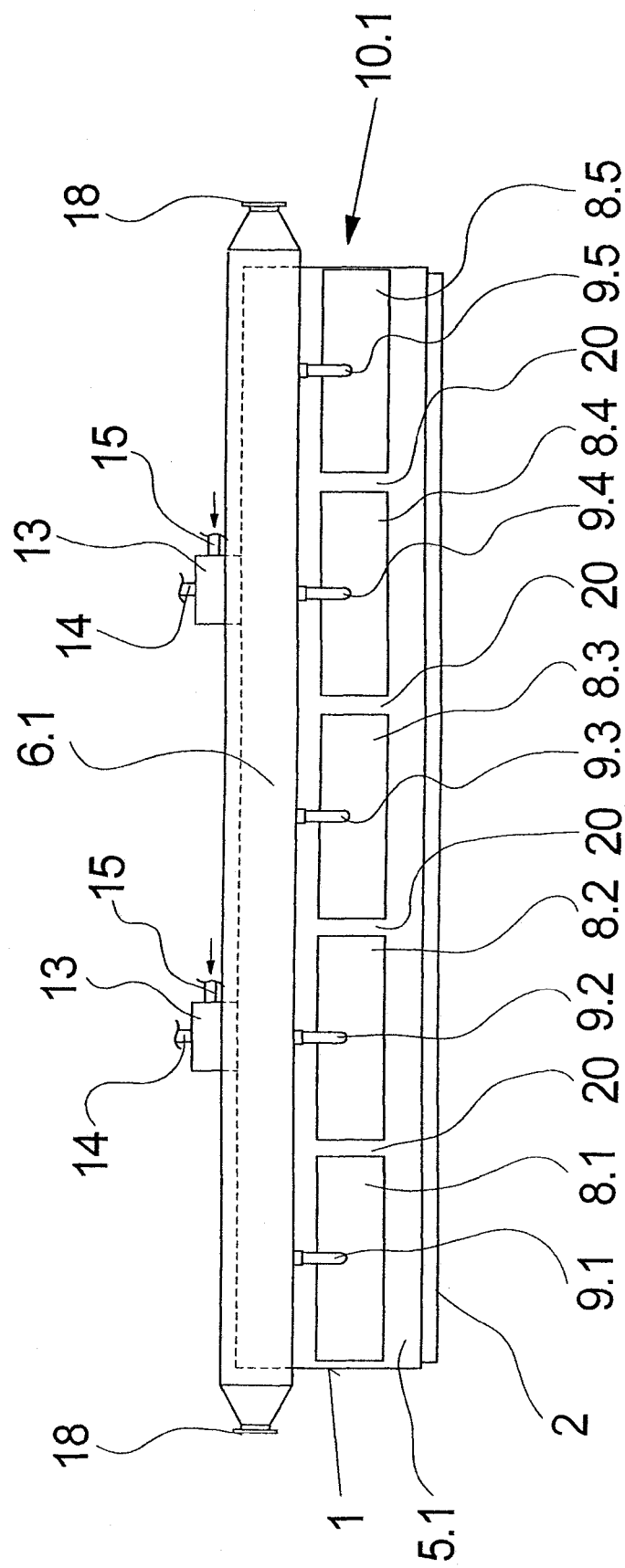
FIG. 2 is a side view of the device of FIG. 1.
Figure 3:
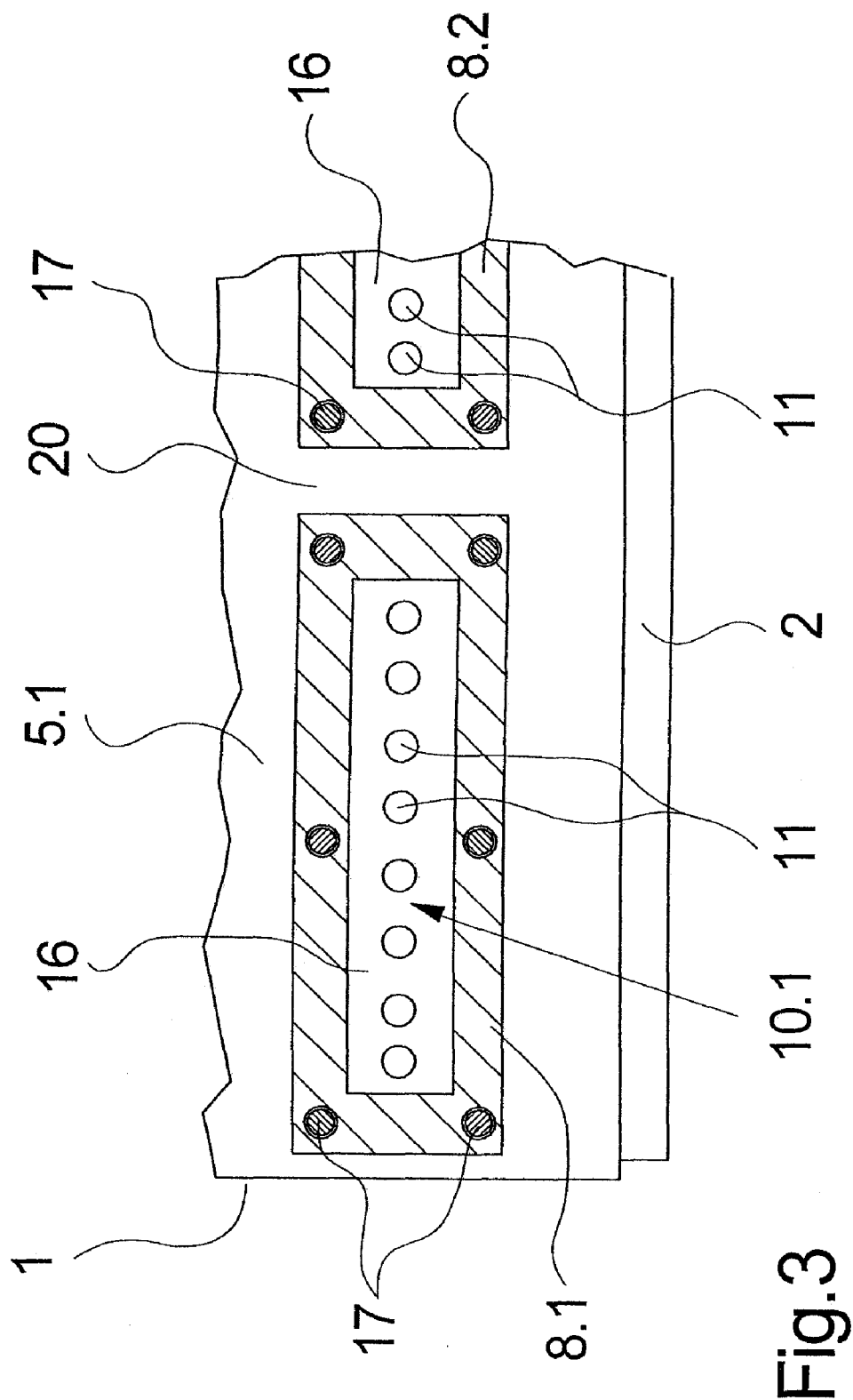
FIG. 3 is a cutout of the side view of the device of FIG. 2.

A first example embodiment of the device is shown in multiple views in FIGS. 1, 2, and 3. In FIG. 1 the example embodiment is shown in a cross-sectional view, in FIG. 2 in a side view, and in FIG. 3 in a cutout of the side view. Unless reference is made to one of the figures, the following description applies to all figures.

The example embodiment of the device has a cuboidal spinneret carrier 1. The spinneret carrier 1 carries a spinneret packet 2 on the bottom side. As shown in the view of FIG. 1, the spinneret packet 2 is held in a connecting groove 3 of the spinneret carrier 1. The spinneret packet 2 is connected to melt channels 12 and air channels 11 via the connecting groove 3.

In this example embodiment the spinneret packet 2 has a plurality of plates by way of example, which are formed by means of an intermediate plate 4.1, a spinneret plate 4.2, and two air conducting plates 4.3 and 4.4. For this purpose a plurality of spinneret openings is provided on the outlet side of the spinneret packet 2, and embodied blow openings are provided laterally adjacent to the spinneret openings. Such spinneret packets 2 are sufficiently known such that no further explanation is provided on the construction and embodiment of the spinneret packet 2 at this point.

As seen in FIGS. 1 and 2 the melt of a thermoplastic material is supplied to the melt channels 12 within the spinneret carrier 1 via multiple spinneret pumps 13. For this purpose the spinneret pump 13 has a melt inlet 15. The spinneret pumps 13 are coupled to a drive (not illustrated) via a drive shaft 14.

In order to feed process air two symmetrically embodied air channel systems 10.1 and 10.2 are embodied in the spinneret carrier 1. The illustration in FIG. 1 shows that each of the air channel systems 10.1 to 10.2 has a plurality of air channels 11 that are arranged at the longitudinal sides 5.1 and 5.2 of the spinneret carrier 1. The air channels 11 end within the spinneret carrier 1 in distribution grooves 19, which are directly connected to the spinneret packet 2.

The air channels 11 of the air channel systems 10.1 and 10.2 are each connected to an air distribution device 7.1 and 7.2. The air distribution devices 7.1 and 7.2 at the two longitudinal sides 5.1 and 5.2 of the spinneret carrier 1 are embodied identically, wherein only the air distribution device 7.1 is shown in the illustrations of FIGS. 2 and 3. Due to the equality of structure the embodiments illustrated in FIGS. 2 and 3 also apply to the air distribution device 7.2.

As an explanation of the air distribution device 7.1 and 7.2 only the air distribution device 7.1 is therefore explained in detail in reference to the figures.

The air distribution device 7.1 is formed by means of multiple distribution segments, which are directly attached to the longitudinal side 5.1. In this example embodiment the air distribution device 7.1 has a total of five distribution segments, which are formed in this example embodiment by means of five distribution blocks 8.1 to 8.5 and five supply lines 9.1 to 9.5. For this purpose an expansion joint 20 is formed between each adjacent distribution segments such that a smaller distance is created between the distribution blocks 8.1 to 8.5. This situation is obvious particularly from the illustration of FIG. 3, wherein the expansion joint 20 is shown between the distribution blocks 8.1 and 8.2 of the air distribution device 7.1.

The distribution blocks 8.1 to 8.5 form multiple distribution chambers 16 at the longitudinal side 5.1 of the spinneret carrier 1, which extend across the endings of multiple air channels 11 of the air channel system 10.1. In this manner a plurality of air channels 11 of the air channel system 10.1 are supplied from the distribution chamber 16 of the distribution block 8.1, as shown in FIG. 3. For this purpose the distribution blocks 8.1 to 8.5 are directly attached to the longitudinal side 5.1 of the spinneret carrier 1 by means of attachment pins 17 in a pressure-tight manner.

A supply line 9.1 to 9.5 is associated with each of the distribution blocks 8.1 to 8.5, which end in the distribution chamber 16 of the distribution blocks 8.1 to 8.5, and are connected to the air tube 6.1. The supply lines 9.1 to 9.5 are embodied in a flexible manner in their entire length or in a longitudinal section such that no rigid connection is created between the air distribution device 7.1 and the air tube 6.1.

As is shown in the illustrations of FIGS. 1 and 2 the air tube 6.1 is embodied in a tubular manner, and has a tube flange 18 at the ends. Hot process air can be supplied to the air tube 6.1 via the tube flange connection. The hot process air, which is maintained at an overpressure, is supplied to the distribution blocks 8.1 to 8.5 via the supply lines 9.1 to 9.5, and reaches into the air channels 11 of the air channel system 10.1 via the distribution chambers 16. From there the process air is guided within the spinneret carrier 1 to the spinneret packets 2.

The air distribution device 7.2 and the air tube 6.2 are embodied identically toward the air distribution device 7.1 and the air tube 6.1 at the longitudinal side 5.2 of the spinneret carrier 1. In this respect any further description is waived. The supply lines and the distribution blocks of the air distribution device 7.2 were equipped with identical reference symbols 9.1 and 8.1 in FIG. 1.

The number and the construction of the distribution segments at both longitudinal sides 5.1 and 5.2 of the spinneret carrier are preferably embodied in an identical manner in order to ensure a uniform feed of the process air. However, for this purpose the distribution blocks 8.1 to 8.5 can be produced from a different material from the spinneret carrier 1. For example, the distribution blocks 8.1 to 8.5 may be embodied from a nickel steel, and the spinneret carrier may be embodied from a cast steel.

Figure 4:
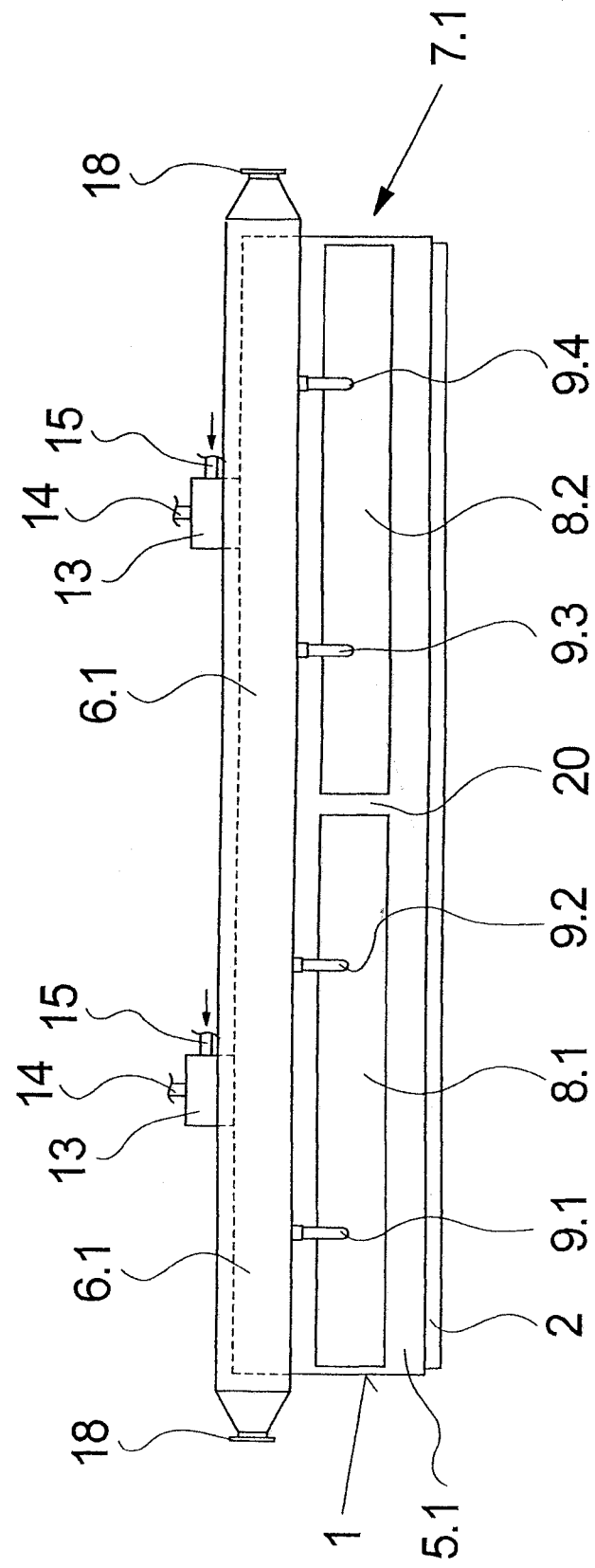
FIG. 4 is a side view of another device according to an embodiment of the invention.

In order to avoid thermal stress in the connections between the distribution blocks 8.1 to 8.5 and the spinneret carrier 1 as much as possible, the expansion joints are selected as a function of the length of the spinneret carrier. For this purpose the expansion joints 20 have a size of a few millimeters. In this manner, spinneret carriers having a total length of >1,500 mm may also be advantageously embodied. In the example embodiments shown in FIGS. 1 to 3 the number of the distribution blocks and of the supply lines of the air distribution devices 7.1 and 7.2 are illustrated by way of example. Generally, more or less distribution segments may be formed as a function of the length of the spinneret carrier 1. FIG. 4 shows a further example embodiment of the device in a side view. In the example embodiment illustrated in FIG. 4 the air distribution device 7.1 has two distribution blocks 8.1 and 8.2. Each of the distribution blocks 8.1 and 8.2 is connected to the air tube 6.1 via two flexible supply lines 9.1 to 9.4 each. The distribution blocks 8.1 and 8.2 are attached at the longitudinal side of the spinneret carrier 1, and have an expansion joint 20 between themselves. The supply lines 9.1 to 9.4 are formed from a flexible material. As an alternative, a longitudinal section of the supply line 9.1 to 9.4 could also be flexibly embodied between the air tube 6.1 and the distribution blocks 8.1 and 8.2 such that a decoupling between the air tube and the spinneret carrier is possible.

The construction and the function of the distribution segments 8.1 and 8.2 are identical to the example embodiment stated above such that reference is made to the description stated above at this point.

While various embodiments of the invention have been particularly shown and described, it will be understood by those skilled in the art that various changes in form and details may be made therein without departing from the spirit and scope of the invention as defined by the appended claims.

| List of Reference Symbols | |
| --- | --- |
| 1 | spinneret carrier |
| 2 | spinneret packet |
| 3 | connecting groove |
| 4.1, 4.2 | spinneret plate |
| 4.3, 4.4 | air conducting plates |
| 5.1, 5.2 | longitudinal side |
| 6.1, 6.2 | air tube |
| 7.1, 7.2 | air distribution device |
| 8.1-8.5 | distribution block |
| 9.1-9.5 | supply line |
| 10.1-10.2 | air channel system |
| 11 | air channel |
| 12 | melt channel |
| 13 | spinneret pumps |
| 14 | drive shaft |
| 15 | melt inlet |
| 16 | distribution chamber |
| 17 | attachment pin |
| 18 | tube flange |
| 19 | distribution grooves |
| 20 | expansion joint |

What is claimed is:

1. A device for meltblowing synthetic fibers having an elongated spinneret packet that is held at a bottom side of a spinneret carrier, the device comprising:
   two elongated air tubes extending at opposite longitudinal sides of the spinneret carrier,
   two air channel systems embodied opposite of each other in the spinneret carrier, by means of which process air is supplied to the spinneret packet, and
   two air distribution devices, which are attached on the longitudinal sides of the spinneret carrier, and which connect the air tubes to the air channel systems for the distribution of the process air, the air distribution devices including multiple distribution segments arranged at the longitudinal sides of the spinneret carrier in a distributed manner, each distribution segment being separated from at least one other distribution segment by an expansion joint,
   wherein each distribution segment includes a distribution block that attaches to the spinneret carrier and a supply line that connects to the air tubes.

2. The device according to claim 1, wherein the supply lines of the distribution segments are flexibly embodied in sections between the air tubes and the distribution blocks of the distribution segments.

3. The device according to claim 1, wherein the distribution blocks form individual distribution chambers at the longitudinal sides of the spinneret carrier, to which multiple air channels of the air channel systems are simultaneously connected.

4. The device according to claim 1, wherein the spinneret carrier and the distribution blocks are formed from different materials.

5. The device according to claim 1, wherein the number and the construction of the distribution segments are embodied identically at the two longitudinal sides of the spinneret carrier.

6. The device according to claim 1, wherein the spinneret carrier has a total length of more than 1,500 mm to receive the spinneret packet and the distribution segments of the air distribution device, the distribution segments being constructed and arranged to couple with the spinneret carrier.

* * * * *